C. J. DALTON.
OVERSIZED PLURAL TRUCK TIRE.
APPLICATION FILED JULY 20, 1921.
1,405,972.
Patented Feb. 7, 1922.
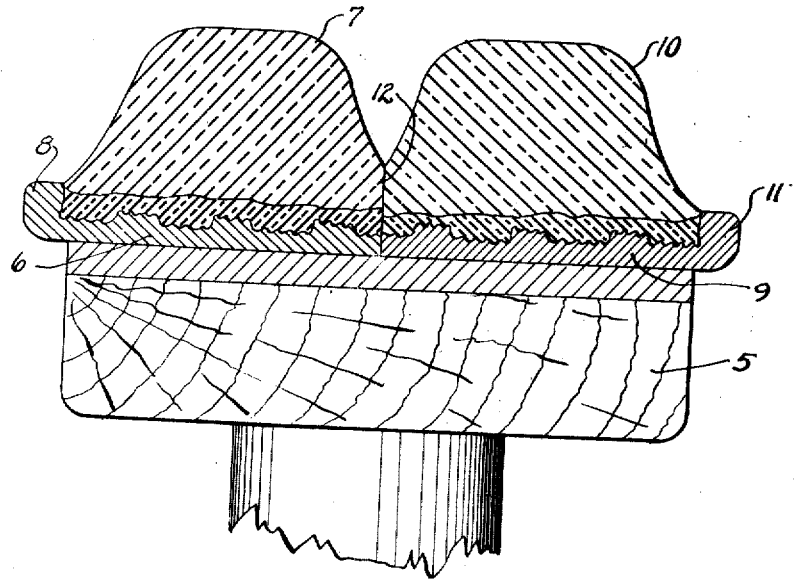
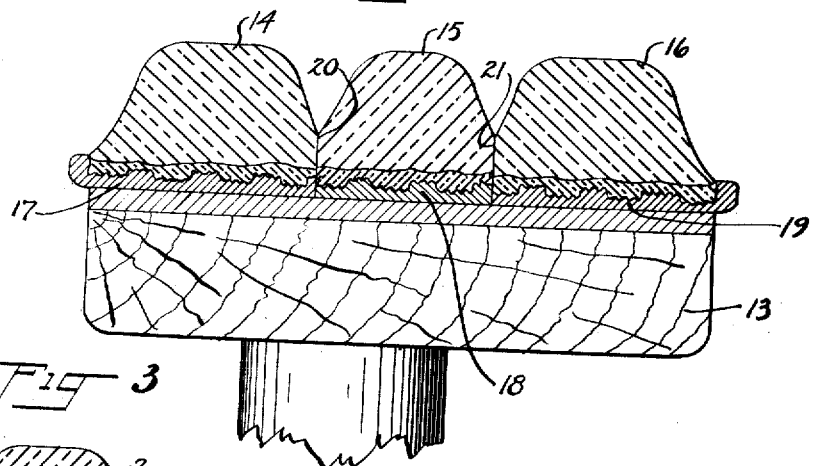
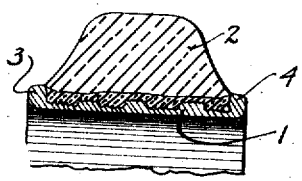
Charles J. Dalton, Inventor
By his Attorney
Thomas Howe

UNITED STATES PATENT OFFICE.

CHARLES J. DALTON, OF NEW YORK, N. Y.

OVERSIZED PLURAL TRUCK TIRE.

1,405,972.

Specification of Letters Patent.    Patented Feb. 7, 1922.

Application filed July 20, 1921. Serial No. 486,178.

*To all whom it may concern:*

Be it known that I, CHARLES J. DALTON, a citizen of the United States of America, residing at the city, county, and State of New York, have invented new and useful Improvements in Oversized Plural Truck Tires, of which the following is a specification.

This invention relates to the oversizing of tires on truck wheels where a plurality of tires are placed side by side upon the wheel.

The expedient of employing a plurality of tires upon a wheel is quite common. There are various reasons for it, among which may be mentioned that the tire units are smaller and easier to handle and further that it is possible to supply tires to a broad wheel by simply placing upon it a number of tires which may be used singly upon smaller wheels. The matter of tire supply is thus simplified because it is not necessary to manufacture so many different sizes of tires.

It has been found that it very frequently occurs that a truck is loaded far beyond its rated capacity and this is especially hard upon the tires. It has been proposed therefore to oversize the tires used. A difficulty arises in this connection, however, from the fact that, the truck wheel having been built to accommodate a number of standard tires of a certain size, it does not readily accommodate the larger sized tires. This is largely because, as before referred to, the tires employed in a plurality upon a wheel are each of the construction and finish which is required when they are used singly. This construction, however, is unnecessarily wasteful of the space across the felly of the wheel, and it is an object of the present invention to provide tires only slightly modified from the standard (when used singly) but which will more economically utilize the space upon the wheel when a plurality of tires is used and so provide for the efficient oversizing of plural tired wheels without departing to any considerable extent (and that not at all difficult) from the standard single tired construction.

Other and ancillary objects of the invention will appear hereinafter.

In the accompanying drawings which illustrate the invention—

Fig. 1 is a section of a wheel felly and two tires thereon showing an embodiment of my invention;

Fig. 2 is a similar view showing the application of the invention to a wheel having a number of tires greater than two; and Fig. 3 is a cross section of a standard tire.

Referring to the drawings, it will be seen by reference to Fig. 3 that the standard tire comprises a metal band 1, upon which is mounted the rubber tread 2, beads 3 and 4 being turned up upon the band outside the edges of the rubber tread 2. When a plurality of such tires are placed side by side upon a wheel, the beads upon the inner side are not important as a protective means as they are when at the outside of the wheel and furthermore the rubber treads of the adjacent tires do not bear against each other so as to have mutual support which contributes to their strength, efficiency and durability.

Referring now to Fig. 1, the felly 5 of the wheel has mounted upon it the two tires, one of which comprises a metal band 6 upon which is mounted the rubber tread 7, the metal band extending beyond the tread where it is formed into a bead 8. The other tire comprises the metal band 9 upon which is mounted the rubber tread 10, the band 9 being formed outside the edge of the tread 10 into the bead 11.

At the inner sides the rubber treads are bounded by plane surfaces bearing against each other at 12 which surfaces it will be seen are substantially perpendicular to the tire axis and the rubber treads bear against each other for mutual support as before referred to. It will be seen that each of the tires of Fig. 1 may be readily formed from the standard tire as shown in Fig. 3 by cutting back one side of the tire so as to remove the edges of both the rubber tread, and the metal band on which it is mounted. This causes the side of the tread cut away to be a plane surface instead of a thin edge as shown in Fig. 3. It also removes the superfluous bead and brings the tread substantially flush with the edge of the band so that it may bear against a similar surface of the tread of an adjacent tire.

It will be seen that these plane surfaces at the sides of the tread are of a width considerably less than one-half the thickness of the tires so that the usual slopes at the sides of the standard tires will cause a considerable space between the tires when the bead and rubber tread are cut away to the extent indicated. This is an important feature as it provides a "displacement space" whereby room is provided at the inner sides of the tires to insert tools for removing the tires and also the tires are permitted to function individually in contacting with the street surface.

Referring now to Fig. 2, the wheel therein shown comprises a felly 13 upon which are mounted the three tires having respectively the rubber treads 14, 15 and 16 mounted upon the metal bands 17, 18 and 19. The two outside tires namely those having the treads 14 and 16 are, it will be seen, of the same construction as the tires of Fig. 1. The intermediate tire having the tread 15, however, has its tread flush with the metal band 18 at both sides as shown at 20 and 21 and both the sides are plane surfaces substantially perpendicular to the tire axis. The wheel width is thus economized to the greatest degree, a firm and efficient tire produced.

It will be seen that the intermediate tire may be formed from the standard as shown in Fig. 3 by cutting away the metal and the rubber on both sides, the same as it is cut away on one side to form the tires of Fig. 1, and the outside tires of Fig. 2.

While the invention has been illustrated in what are considered its best applications it may have other embodiments without departing from its spirit and is not limited to the structures shown in the drawings.

What I claim is:

The combination with a wheel, of a plurality of tires thereon, each of said tires comprising a metal band and a rubber tread mounted thereon, the two outside tires having beads on their bands outside their rubber treads and at their opposite sides having the sides of the treads plane surfaces substantially perpendicular to the tire axis and substantially flush with the said metal bands of the tires, an intermediate tire having the sides of its rubber tread plane surfaces substantially perpendicular to the tire axis and substantially flush with the sides of its metal band.

In testimony whereof I have signed this specification this 21st day of May 1921.

CHARLES J. DALTON.